Sept 8, 1925.  
G. A. TRACHTE ET AL  
TRUSS  
Filed July 28, 1922  2 Sheets-Sheet 1
1,552,777
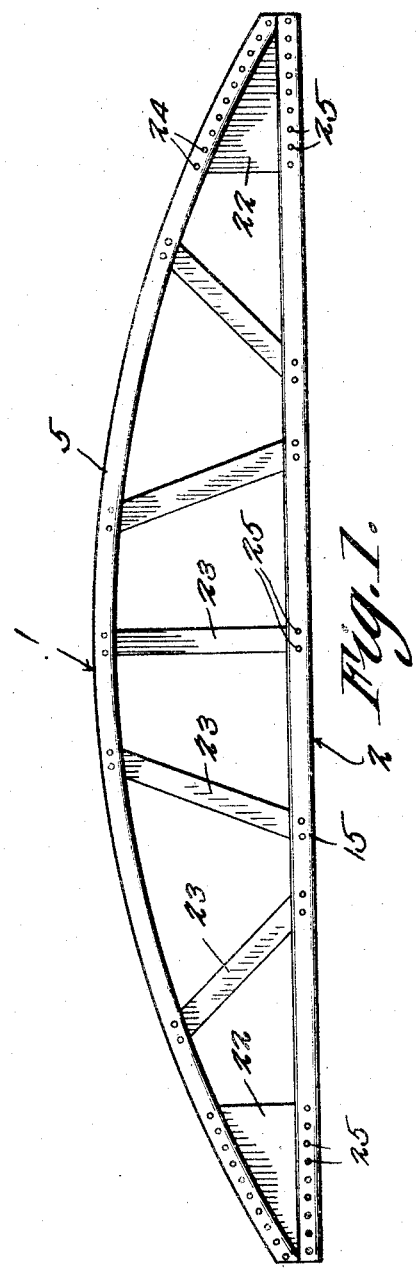
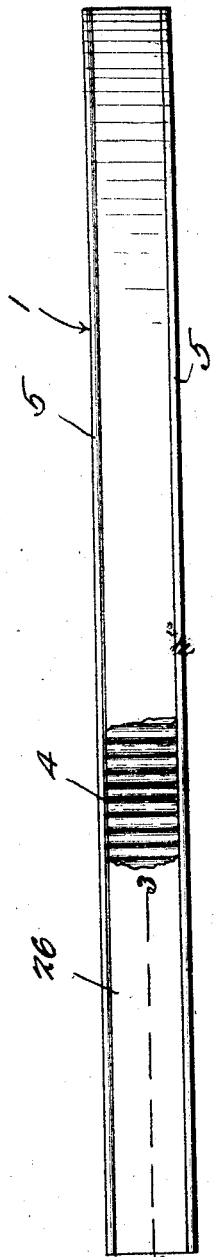
Inventors  
G. A. Trachte  
A. F. Trachte  
By C. A. Snow & Co.  
Attorneys.

Sept. 8, 1925.                               1,552,777
G. A. TRACHTE ET AL
TRUSS
Filed July 28, 1922        2 Sheets-Sheet 2
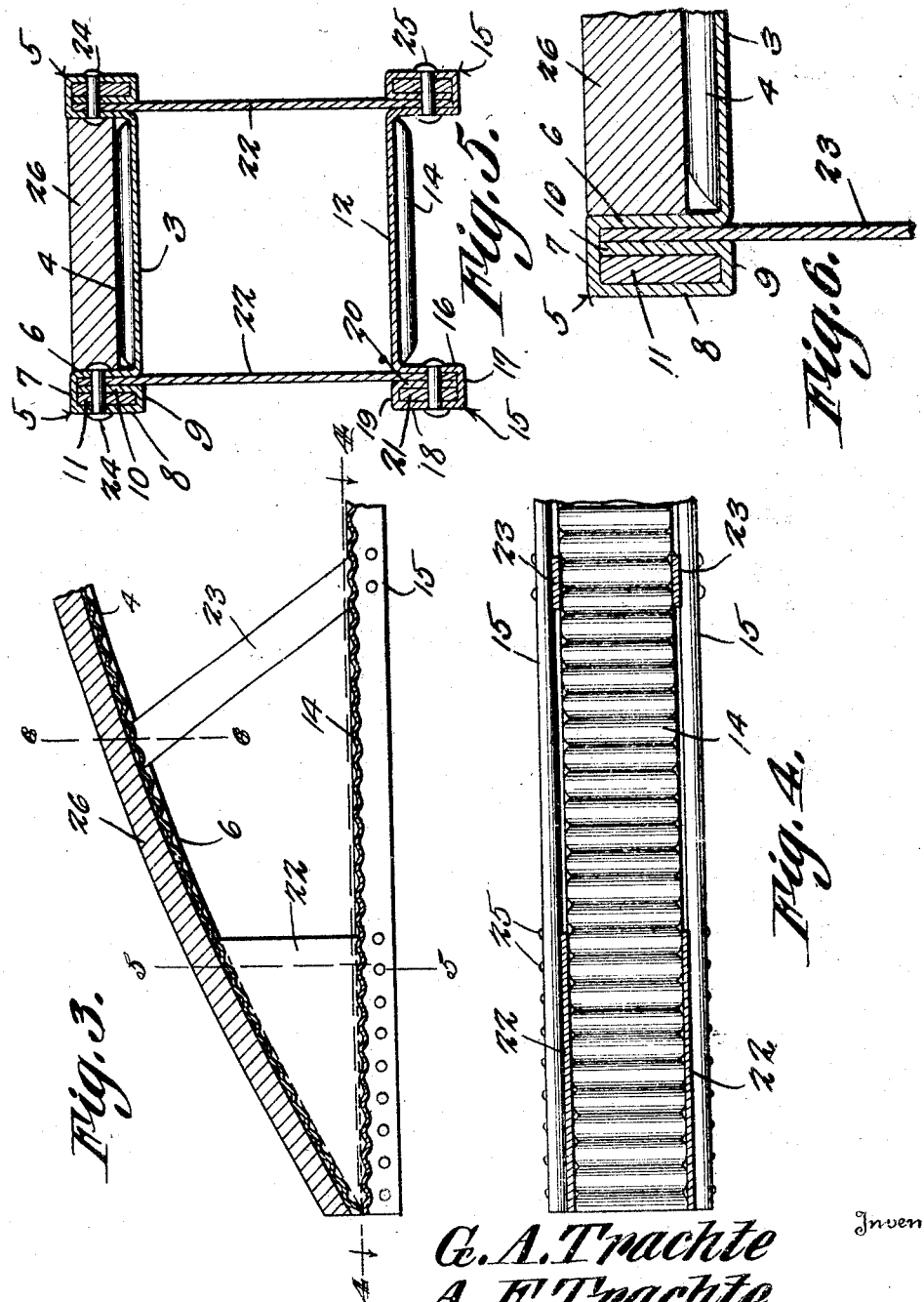
Inventors,
G. A. Trachte
A. F. Trachte
By C. A. Snow & Co.
Attorneys.

Patented Sept. 8, 1925.

1,552,777

UNITED STATES PATENT OFFICE.

GEORGE A. TRACHTE AND ARTHUR F. TRACHTE, OF MADISON, WISCONSIN.

TRUSS.

Application filed July 28, 1922. Serial No. 578,235.

*To all whom it may concern:*

Be it known that we, GEORGE A. TRACHTE and ARTHUR F. TRACHTE, citizens of the United States, residing at Madison, in the county of Dane, State of Wisconsin, have invented a new and useful Truss, of which the following is a specification.

This invention aims to improve the construction of the upper and lower members of a truss, and to provide novel means for connecting the upper and lower members of a truss.

It is within the province of the disclosure to improve generally and to enhance the utility of devices of that type to which the invention appertains.

In the drawings:—

Figure 1 is a side elevation; Figure 2 is a top plan, parts being broken away; Figure 3 is a section on the line 3—3 of Figure 2; Figure 4 is a section on the line 4—4 of Figure 3; Figure 5 is a section on the line 5—5 of Figure 3; Figure 6 is a section on the line 6—6 of Figure 3.

The truss includes an upper member 1 and a lower member 2, the upper member comprising a body 3 having transverse corrugations 4 and provided along its longitudinal edges with beads 5 each including an upstanding side 6, a top 7, a depending side 8, a bottom 9, and an upstanding lip 10 extended to the top 7 and spaced from the sides 8 and 6. In the compartment defined by the top 7, the side 8, the bottom 9 and the lip 10, a reinforcing member 11, made of metal, and extended the full length of the part 1, is located.

The truss includes the lower member 2, above mentioned, the same comprising a body 12 having transverse corrugations 14 and provided along its longitudinal edges with beads 15 each including a depending side 16, a bottom 17, an upstanding side 18, a top 19, and a depending lip 20 spaced from the sides 16 and 18. In the compartment defined by the top 19, the side 18, the bottom 17 and the lip 20, a reinforcing member 21 is located, the reinforcing member being made of metal, and being extended the full length of the member 2.

Connecting plates 22 unite the members 1 and 2 at their ends. The upper edge of each connecting plate 22 is disposed between the side 6 and the lip 10 of the bead 5 on the member 1. The lower edge of each connecting plate 22 is disposed between the side 16 and the lip 20 of the bead 15 on the member 2. Any desired number of connections 23 are provided. The connections may be compression elements or tension elements, and may be located as is considered expedient, the truss of course being designed with proper regard for the amount of load and the nature of the load which it is to carry. The upper end of each connection 23 is located between the side 6 and the lip 10 of the bead 5 on the member 1. The lower end of each connection 23 is located between the side 16 and the lip 20 of the bead 15 on the lower member 2. Securing devices 24 pass through the parts 8, 10 and 6 of the bead 5, and through the reinforcing member 11, these securing devices passing through the upper edge of the connecting plate 22 and through the upper end of the connection 23. Securing members 25 pass through the parts 18, 20 and 16 of the bead 15, and through the reinforcing member 21, these securing devices passing through the lower edge of the connecting plate 22 and through the upper end of the connection 23. If the truss is to be used in a roof, it may be expedient to place a filler 26, which may be made of wood, in the trough formed by the body 3 and the sides 6 of the upper member 1, to the end that the roof timbers may be spiked or connected otherwise to the filler.

The upper member 1 of the truss has great strength, because it is corrugated transversely at 4, provided with beads 5, and equipped with reinforcing members 11 disposed within the beads. The particular relations existing between the plates 22 and the connections 23, on the one hand, and the beads 5, on the other hand, contribute to the strength of the truss. The same advantages inhere in the lower member 2.

Since the filler 26 is supported on the beads 4, the filler is not in contact with metal throughout its length, and air can find its way beneath the filler, the result being that the filler will not rot quickly, should it be subjected to moisture.

We claim:—

1. A truss comprising an upper member and a lower member provided along their longitudinal edges with beads; reinforcing members completely enclosed in the beads; and connections uniting the upper and lower members, the connections being received in the beads.

2. A truss comprising an upper member, and a lower member forming a chord for the upper member, the upper member comprising a body having transverse corrugations, and provided along its longitudinal edges with beads; reinforcing elements in the beads; a filler disposed between the beads and supported on the corrugations; and connections uniting the upper and lower members and received terminally in the beads.

In testimony that we claim the foregoing as our own, we have hereto affixed our signatures.

GEO. A. TRACHTE.
A. F. TRACHTE.